US012334065B2

(12) United States Patent
Birt et al.

(10) Patent No.: US 12,334,065 B2
(45) Date of Patent: Jun. 17, 2025

(54) VOICE COMMAND RECOGNITION SYSTEM

(71) Applicant: ROKU, INC., San Jose, CA (US)

(72) Inventors: Ralph Birt, Santa Clara, CA (US);
Robert Curtis, Los Gatos, CA (US);
David H. Friedman, Austin, TX (US)

(73) Assignee: ROKU, INC., San Jose, CA (US)

( * ) Notice: Subject to any disclaimer, the term of this patent is extended or adjusted under 35 U.S.C. 154(b) by 296 days.

(21) Appl. No.: 17/315,704

(22) Filed: May 10, 2021

(65) Prior Publication Data

US 2022/0358915 A1    Nov. 10, 2022

(51) Int. Cl.
*G10L 15/22*        (2006.01)
*G10L 15/08*        (2006.01)
(Continued)

(52) U.S. Cl.
CPC .............. *G10L 15/22* (2013.01); *G10L 15/08* (2013.01); *G10L 21/034* (2013.01);
(Continued)

(58) Field of Classification Search
CPC ....... G10L 15/22; G10L 15/08; G10L 21/034; G10L 21/0364; G10L 25/51;
(Continued)

(56) References Cited

U.S. PATENT DOCUMENTS 11,164,592 B1 * 11/2021 Wu ................. G10L 21/034
2001/0000534 A1 * 4/2001 Matulich .............. G10L 15/26
704/E15.045
(Continued)

FOREIGN PATENT DOCUMENTS

JP          2002076996 A  *  3/2002
WO     WO 2020/141794 A1      7/2020
WO     WO-2020220345 A1  * 11/2020

OTHER PUBLICATIONS

Jakovljevic, N. et al., "Energy Normalization in Automatic Speech Recognition"; TSD 2008, LNAI 5246, pp. 341-347 (Sep. 8, 2008).
(Continued)

*Primary Examiner* — Daniel C Washburn
*Assistant Examiner* — Paul J. Mueller
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for a voice command recognition system (VCR). An example embodiment operates by receiving a voice command directed to controlling a device, the voice command including a wake command and an action command. An amplitude of the wake command is determined. A gain adjustment for the voice command is calculated based on a comparison of the amplitude of the wake command to a target amplitude. An amplitude of the action command is adjusted based on the calculated gain adjustment for the voice command based on the comparison of the amplitude of the wake command to the target amplitude. A device command for controlling the device is identified based on the action command comprising the adjusted amplitude. The device command is provided to the device.

20 Claims, 6 Drawing Sheets

(51) Int. Cl.
    *G10L 21/034*     (2013.01)
    *G10L 21/0364*     (2013.01)
    *G10L 25/51*     (2013.01)

(52) U.S. Cl.
    CPC .......... *G10L 21/0364* (2013.01); *G10L 25/51* (2013.01); *G10L 2015/088* (2013.01); *G10L 2015/223* (2013.01)

(58) Field of Classification Search
    CPC ......... G10L 2015/088; G10L 2015/223; G10L 21/0316; G10L 15/00; H04R 3/00; H04R 2430/01
    See application file for complete search history.

(56) References Cited

U.S. PATENT DOCUMENTS

| | | | | |
|---|---|---|---|---|
| 2002/0099300 | A1* | 7/2002 | Kovtun | A61B 5/30 600/509 |
| 2005/0221778 | A1* | 10/2005 | Ishihara | H03M 1/183 455/234.1 |
| 2008/0090617 | A1* | 4/2008 | Sutardja | H04M 1/67 455/562.1 |
| 2008/0200139 | A1* | 8/2008 | Kobayashi | H03G 3/3026 455/232.1 |
| 2013/0325484 | A1* | 12/2013 | Chakladar | G10L 15/26 704/275 |
| 2014/0117852 | A1* | 5/2014 | Zhai | H05B 45/20 315/86 |
| 2020/0279575 | A1* | 9/2020 | Unno | H03G 3/3005 |
| 2020/0380982 | A1* | 12/2020 | Sereshki | H04M 9/082 |
| 2022/0084519 | A1* | 3/2022 | Kim | G08C 17/00 |

OTHER PUBLICATIONS

Régo, N., "How to Hear a Sound on Your Google Speaker After Saying OK Google", Cool Blind Tech; Retrieved from the Internet at URL:https://coolblindtech.com/how-to-heara-sound-on-your-google-speaker-after-saying-ok-google/, 3 pages (Nov. 8, 2019).

Extended European Search Report directed to related European Application No. 22172601.1, mailed Oct. 19, 2022; 9 pages.

\* cited by examiner

VOICE COMMAND RECOGNITION SYSTEM

FIELD

This disclosure is generally directed to recognizing voice commands for voice responsive devices.

BACKGROUND

A voice responsive device (VRD) is an electronic device that responds to audible or voice commands spoken by users. Examples of VRDs include digital assistants, televisions, media devices, smart phones, computers, tablets, appliances, smart televisions, and internet of things (IOT) devices, to name just some examples.

One of the challenges with processing voice commands is that these commands are often spoken and thus received at different volumes. Sometimes a user will speak loudly, other times softly, and different users speak differently. As such, it can become challenging to recognize and process voice commands with such wide variances in audio quality or volume.

SUMMARY

Provided herein are system, apparatus, article of manufacture, medium, method and/or computer program product embodiments, and/or combinations and sub-combinations thereof, for a voice command recognition system (VCR).

An embodiment include a method. The method may include receiving a voice command directed to controlling a device, the voice command including a wake command and an action command. An amplitude of the wake command is determined. A gain adjustment for the voice command is calculated based on a comparison of the amplitude of the wake command to a target amplitude. An amplitude of the action command is adjusted based on the calculated gain adjustment for the voice command based on the comparison of the amplitude of the wake command to the target amplitude. A device command for controlling the device is identified based on the action command comprising the adjusted amplitude. The device command is provided to the device.

Another embodiment includes a system that may include a memory and at least one processor communicatively coupled to the memory. The processor may be configured to receive a voice command directed to controlling a device, the voice command including a wake command and an action command. An amplitude of the wake command is determined. A gain adjustment for the voice command is calculated based on a comparison of the amplitude of the wake command to a target amplitude. An amplitude of the action command is adjusted based on the calculated gain adjustment for the voice command based on the comparison of the amplitude of the wake command to the target amplitude. A device command for controlling the device is identified based on the action command comprising the adjusted amplitude. The device command is provided to the device.

A further embodiment includes a non-transitory computer-readable medium having instructions stored thereon that, when executed by at least one computing device, causes the computing device to perform operations. These operations may include receiving a voice command directed to controlling a device, the voice command including a wake command and an action command. An amplitude of the wake command is determined. A gain adjustment for the voice command is calculated based on a comparison of the amplitude of the wake command to a target amplitude. An amplitude of the action command is adjusted based on the calculated gain adjustment for the voice command based on the comparison of the amplitude of the wake command to the target amplitude. A device command for controlling the device is identified based on the action command comprising the adjusted amplitude. The device command is provided to the device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method, medium, and/or computer program product embodiments, and/or combinations and sub-combinations thereof, for recognizing voice commands.

A voice responsive device (VRD) is an electronic device that responds to audible or voice commands (also called audio commands) spoken by users. Examples of VRDs include digital assistants, televisions, media devices, smart phones, computers, tablets, appliances, smart televisions, and internet of things (IOT) devices, to name just some examples.

One of the challenges with processing voice commands is that these commands are often spoken and thus received at different volumes and from varying distances relative to a receiving microphone. Sometimes a user will speak loudly, other times softly, and different users speak differently. Users may also be standing near the microphone or across the room far away from it, which can produce variances in the quality and loudness of the sounds detected or received by the microphone. As such, it can become challenging to recognize and process audio commands with such wide variances in audio quality or volume.

Figure 1:
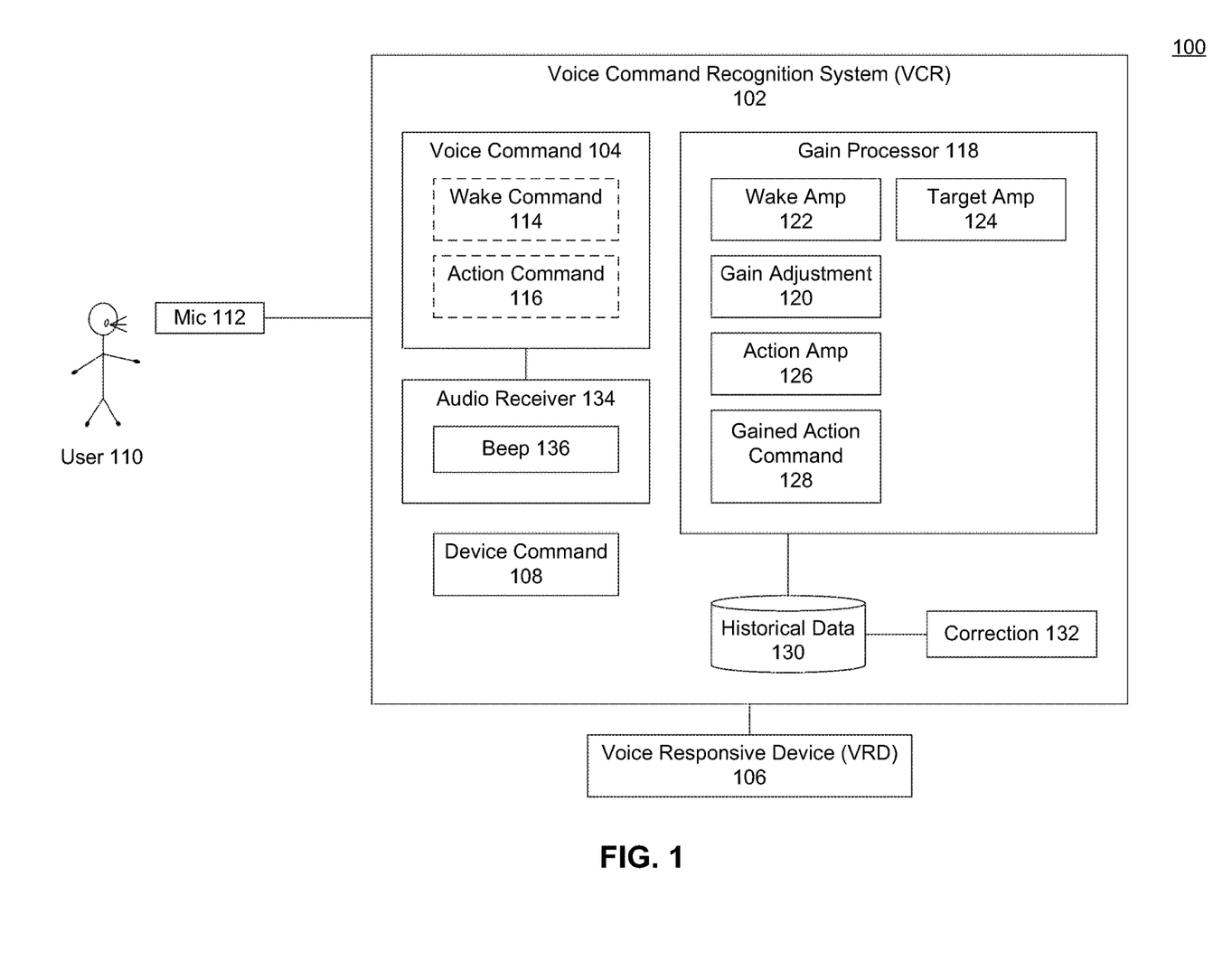
FIG. 1 illustrates a block diagram of a voice command recognition system (VCR), according to some embodiments.

FIG. 1 illustrates a block diagram of a voice command recognition system (VCR) 102, according to some embodiments. Voice command recognition system (VCR) 102 may recognize and process an audible or voice command 104 for operating a voice responsive device (VRD) 106. In some embodiments, VCR 102 may normalize or smooth out the audio characteristics of a voice command 104 for improved audio processing.

For example, in some embodiments, VCR 102 may adjust the amplitude of a voice command 104 based on variances between the received characteristics of the voice command 104 relative to target characteristics for processing the voice command 104. These audio adjustments may enable VCR 102 and/or other audio input/output systems to more quickly and/or accurately process the adjusted voice command (relative to the received non-adjusted command). The audio processing may include, for example, identifying a device command 108, converting text-to-speech, performing language translations, or performing other audio processing functionality.

In an embodiment, a user 110 may speak into a microphone (mic) 112 to operate VRD 106. Mic 112 may be configured to record or receive audio from a user 110 and/or the environment of the user 110, which may include background noises. Mic 112 may provide the received audio (e.g., speech, noise, and/or other audio) to VCR 102. VCR 102 may receive the voice command 104, identify different sub-commands or speech portions within the received audio, adjust audio characteristics, and identify a device command 108 for operating a VRD 106.

In an embodiment, a voice command 104 may include different portions or sub-commands, such as a wake command 114 (also called a wake word) and an action command 116. Wake command 114 may be one or more initial words that signal that a VRD action or operational command 116 is to follow. For example, for the AMAZON ECHO (e.g., VRD 106), a voice command 104 may be "ALEXA, turn on the family room lights," of which "ALEXA" may be the wake command 114 and "turn on the family room lights" may be the action 116 command.

VRD 106 may be an electronic device that responds to audible or voice commands 104 spoken by a user 110. Examples of a VRD 106 include, but are not limited to, digital assistants, televisions, media devices, smart phones, computers, tablets, appliances, and internet of things (IOT) devices, to name just some examples.

In an embodiment, VRD 106 may be connected to one or more other devices (e.g., sound system, speaker, light, television, thermostat, home security, computer, IoT device), which are operational through voice commands 104 issued to VRD 106. For example, the AMAZON ECHO (e.g., VRD 106) may be connected to a sound bar which may be controlled through the AMAZON ECHO (e.g., turn on/off, volume up/down, increase bass, adjust treble, change audio environment setting, etc.).

One of the challenges with processing voice commands 104 is that the audio received from a user 110 can vary in its volume, quality, or other audio characteristics. A user 110 may speak in a loud or soft voice depending on their mood or other environmental circumstances. For example, the user 110 may increase their voice while speaking if they are excited or there is background noise (such as a police siren), or decrease their voice if their baby is sleeping or they are tired. Such volume changes or other alterations in the user 110's voice while speaking the voice command 104 may make it difficult to accurately process the user's speech or voice and recognize the action command 116 in the voice command 104.

In an embodiment, a gain processor 118 may normalize or apply audio characteristic adjustments to voice command 104 to aid in speech or audio processing. In an embodiment, gain processor 118 may apply a gain adjustment 120 to increase (or decrease) the loudness of at least a portion of the voice command 104. While gain is identified as an exemplary audio characteristic that is adjusted by VCR 102, it is understood that in other embodiments, other audio characteristics of voice command 104 (such as bass, treble, pitch, speed, etc.) may be adjusted in a similar manner as described herein, and the audio adjustments are not limited to gain, but may include any audio characteristic(s).

In an embodiment, VCR 102 may apply audio adjustments to the action command 116 portion of voice command 104 based on an audio analysis of the wake command 114 portion of voice command 104. In an embodiment, gain processor 118 may calculate, measure, or determine a wake amplitude 122 of wake command 114. In an embodiment, amplitude may be measure of a strength or level of energy or sound pressure.

Gain processor 118 may compare wake amp 122 to a target amplitude 124. Target amp 124 may be an ideal, goal, or minimum measure of amplitude for audio that is to undergo voice or speech processing. In an embodiment, the closer an amplitude of audio is to target amp 124, the more accurate audio processing may be performed on the audio.

Gain processor 118 may calculate a gain adjustment 120. In an embodiment, the gain adjustment 120 may be a difference between wake amp 122 and target amp 124. For example, if wake amp 122 is −30 decibels (dB) and target amplitude is −25 dB, the gain adjustment 120 may be 5 dB.

In an embodiment, gain processor 118 may apply the gain adjustment 120 to an action amplitude 126 (e.g., amplitude of action command 116) to generate a gained action command 128. In an embodiment, gain processor 118 may use just-in-time computing processes to apply gain adjustment 120 to action command 116, such that the audio adjustment is performed in real-time without first computing or identifying action amp 126 of action command 116. This real-time application of gain adjustment 120 to action command 116 may save computing resources and time, reducing latency while also increasing the accuracy of speech processing on gained action command 128.

In an embodiment, VCR 102 may then identify a device command 108 for operating VRD 106 from the gained action command 128. In an embodiment, identifying device command 108 may include converting gained action command 128 to text, and comparing the text to a set of valid operational commands for VRD 106.

FIG. 1 illustrates one example embodiment and configuration of audio processing by VCR 102. However, in other embodiments, the functionality and processing of VCR 102 as described herein may be organized differently. For example, mic 112 and/or VCR 102 functionality may be integrated within VRD 106 as a single device. Or, for example, mic 112 and/or VCR 102 functionality may be integrated into a mobile device or remote control associated or communicatively coupled to VRD 106). Or, for example, VCR 102 functionality may exist on a cloud network that communicates with the remote control and/or VRD 106 communicatively coupled to mic 112.

In an embodiment, VCR 102 may track historical data 130 which may be used to apply a correction 132 to the audio adjustments of gain processor 118. Historical data 130 may include a history of the various gain adjustments 120 applied to voice commands 104 by VCR 102. In an embodiment, the historical data 130 may be organized based on a user or remote control or other device from which the voice command 104 is received.

In some embodiments, VCR 102 may also be configured to differentiate between different users 110 using one or more speaker detection processes. For example, based on a cadence or timbre of the voice or speech of user 110, the VCR 102 may use one or more machine learning algorithms to classify and identify the user 110.

In some embodiments, VCR 102 may be configured to differentiate between different users 110 using data from one or more sensors in a remote control that a user 110 may have handled or may be handling. For example, based on a velocity or speed at which the user 110 picks up the remote control or a movement pattern of the remote control, VCR 102 may use one or more machine learning algorithms to classify and identify the user 110.

For example, the one or more machine learning algorithms may include classification algorithms, such as, but not limited to, k-Nearest Neighbors, decision trees, naive bayes, random forest, or gradient boosting. Additionally, the one or more machine learning algorithms may be used to detect certain velocities and/or movement patterns and associate such velocities and/or movement patterns with a given user. In an embodiment, historical data 130 may include movement patterns corresponding with different users 110. As such, when the velocities and/or movement patterns are detected again in the future, VCR 102 may identify a particular user 110 accordingly.

The machine learning algorithms may further include an association algorithm, such as, but not limited to, an apriori algorithm, eclat algorithm, or a frequent-pattern growth (FP-growth) algorithm. Based on identifying which user 110 is interacting with the remote control, the VCR 102 may modify a time period for evaluating the RMS amplitude of the voice command versus time. For example, VCR 102 may increase or decrease the time period for evaluating the voice command for each individual user based on the cadence and/or timbre. For example, for some users that speak with a slower cadence than other users, VCR 102 may increase the time period for evaluating the voice command, whereas, for some users that speak with a faster cadence, VCR 102 may decrease the time period for evaluating the voice command 104.

As noted above, the adjustments (such as gain adjustment 120 or cadence or other audio adjustments) may be tracked in a database or other storage as historical data 130, which may be organized on a per user basis. For example, historical data 130 may include a first set of data for audio adjustments applied to voice commands 104 from user A, and a second set of data for audio adjustments applied to voice commands 104 from user B. In some embodiments, historical data 130 may be stored locally at VRD 106 or VCR 102, or accessed from the cloud or via other network capabilities.

In an embodiment, VCR 102 may calculate a correction 132 for user A. VCR 102, or another machine learning or cloud-based process, may compare the historical audio adjustments for user A against target amp 124. And if the gained action command 128 for user A is statistically (average, mean, median, etc.) 6 dBs below target amp 124, then correction 132 may be 6 dBs. Then, for example, when a subsequent voice command 104 is identified as being received from user A, gain processor 118 may adjust the action command 116 by applying both gain adjustment 120 and correction 132. However, a subsequent command from user B would not include correction 132 for user A. Or, for example, correction 132 may be calculated across multiple or all users 110 of the system.

In some embodiments, historical data 130 may be used to identify and/or discard (or not record in historical data 130) outliers of voice commands 104. For example, if a user 110 screams into the mic 112, this may register an outlier relative to normal spoken voice commands 104 from user 110. Less or no gain may be applied to a screamed/loud voice command 104. Similarly, if the user 110 is speaking from across the room, this may require a large outlier in terms of the gain adjustment 120 applied. Both of these outliers may be identified based on comparing the gain adjustment 120 to a median gain adjustment from historical data 130, and may not be used to calculate correction 132.

As noted above, the VRD 106 may be voice responsive and operable to recognize and process voice commands 104 spoken by users 110. A voice command 104 typically includes a wake command 114 followed by an action command 116. In some embodiments, an audio receiver 134 of VCR 102 may output an audible notification or beep 136 indicating the voice command 104 was received or that the VRD 106 is listening for an action command 116. In an embodiment, beep 136 may be an audible notification or sound that is output through a speaker of VRD 106, a remote control, a mobile device, or another device with audio output capabilities.

In an embodiment, the beep 136 may be output upon identification of the wake command 114, indicating the VRD 106 is ready to receive an action command 116. However, some users 110 may speak fast or continuously, and as such, if user 110 speaks the action command 116 immediately after the wake command 114, without waiting for beep 136 before speaking the action command 116, then the beep 136 may be received by mic 112 at the same time as the action command 116, and thus interfere with the ability to accurately recognize the action command 116 (because beep 136 may be received and interpreted as part of voice command 104).

Accordingly, in some embodiments, audio receiver 134 may be configured to detect whether the voice command 104 is a continuous stream of speech such that the user 110 does not pause for any significant length of time (e.g., at least long enough for beep 136 to be output) between speaking the wake command 114 and speaking the action command 116.

To determine whether the voice command is a continuous stream of speech, audio receiver 134 may analyze the voice command to detect bursts of energy in a specified period of time. For example, audio receiver 134 may analyze an average root mean square (RMS) amplitude of the voice command 104 versus time, and the audio receiver 134 may determine that the voice command 104 is a continuous stream of speech based on such analysis. For example, in some embodiments, audio receiver 134 may analyze a ratio of a peak-to-average amplitude of successive frames of the voice command using an exponential-decay smoothing. As an example, the audio receiver 134 may use a sampling rate of 16 k/sec and each frame may include 256 samples. In some embodiments, a ratio greater than or equal to one (1) may indicate that continuous speech is present, whereas a ratio less than one (1) may indicate that continuous speech is not present.

Figure 2:
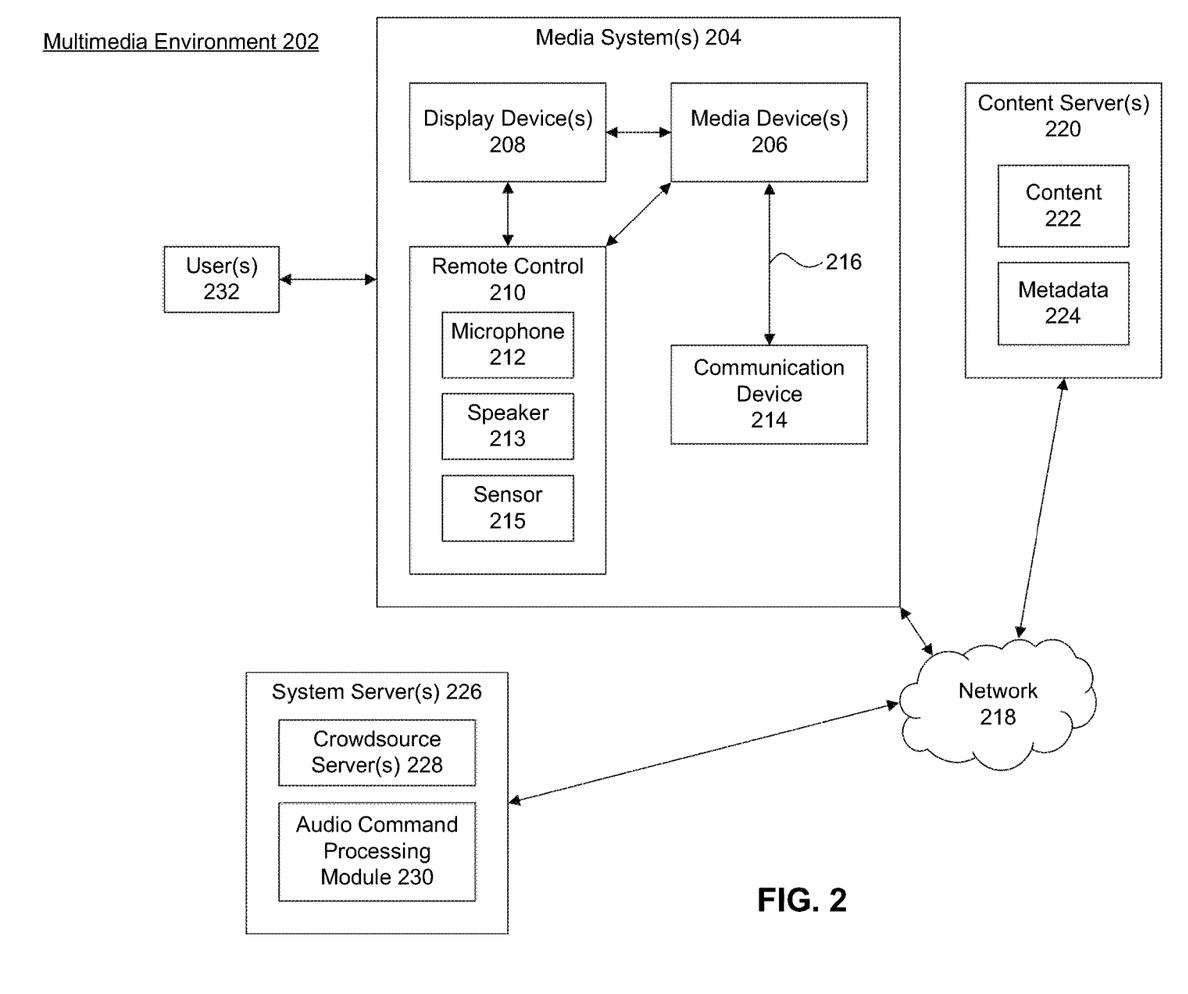
FIG. 2 illustrates a block diagram of a multimedia environment, according to some embodiments.

Based on whether the audio receiver 134 detected the continuous stream of speech, the audio receiver 134 may a remote control 210 or VRD 106 to selectively provide or not provide beep 136. For example, if a continuous stream of speech is detected, audio receiver 134 may lower the volume on, mute, or otherwise suppress the beep 136. In another embodiment, audio receiver 134 may not send a beep 136 signal for audio output. Or, for example, if the continuous stream of speech is not detected, VRD 106 may automatically output beep 136 as it was configured to do, or audio receiver 134 may provide the beep 136 signal for output. In this way, audio receiver 134 ensures that the audible notification (i.e., beep 136) does not interfere with recognizing the action command 116 following the wake command 114 in the spoken voice command 104 when the user 110 does not pause between speaking the wake command 114 and speaking the action command 116.

In some embodiments, in addition to suppressing the audible notification when the voice command is determined to be a continuous stream of speech, the audio receiver 134 may cause the remote control and/or the VRD 106 to provide an alternative non-audio notification to the user 110 responsive to detecting the wake command 114. For example, a visual or haptic notification may be provided to the user 110 via the remote control (using any well-known haptic module in the remote control), and/or the VRD 106. In this way, the user 110 may still be notified that VRD 106 or remote control received and/or recognized the wake command 114 and is processing the voice command 104 or awaiting the action command 116.

Solely for purposes of convenience, and not limitation, embodiments of this disclosure are described with respect to an example multimedia environment 202 shown in FIG. 2. However, this example application is provided solely for illustrative purposes, and is not limiting. Embodiments of this disclosure are applicable to any VRD in any application and/or environment, as will be understood by persons skilled in the relevant art(s) at least based on the teachings contained herein.

FIG. 2 illustrates a block diagram of a multimedia environment 202, according to some embodiments. In a non-limiting example, multimedia environment 202 may be directed to streaming media. However, this disclosure is applicable to any type of media (instead of or in addition to streaming media), as well as any mechanism, means, protocol, method and/or process for distributing media.

The multimedia environment 202 may include one or more media systems 204. A media system 204 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 232 may operate with the media system 204 to select and consume content.

Each media system 204 may include one or more media devices 206 each coupled to one or more display devices 208. It is noted that terms such as "coupled," "connected to," "attached," "linked," "combined" and similar terms may refer to physical, electrical, magnetic, logical, etc., connections, unless otherwise specified herein.

Media device 206 may be a streaming media device, DVD or BLU-RAY device, audio/video playback device, cable box, and/or digital video recording device, to name just a few examples.

In embodiments of this disclosure, media device 206 may be a voice responsive device (VRD) that responds to voice commands spoken by users 232.

Display device 208 may be a monitor, television (TV), computer, smart phone, tablet, wearable (such as a watch or glasses), appliance, internet of things (IoT) device, and/or projector, to name just a few examples. In some embodiments, media device 206 can be a part of, integrated with, operatively coupled to, and/or connected to its respective display device 208.

Each media device 206 may be configured to communicate with network 218 via a communication device 214. The communication device 214 may include, for example, a cable modem or satellite TV transceiver. The media device 206 may communicate with the communication device 214 over a link 216, wherein the link 216 may include wireless (such as WiFi) and/or wired connections.

In various embodiments, the network 218 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 204 may include a remote control 210. The remote control 210 can be any component, part, apparatus and/or method for controlling the media device 206 and/or display device 208, such as a remote control, a tablet, laptop computer, smartphone, wearable, on-screen controls, integrated control buttons, audio controls, or any combination thereof, to name just a few examples. In an embodiment, the remote control 210 wirelessly communicates with the media device 206 and/or display device 208 using cellular, Bluetooth, infrared, etc., or any combination thereof.

The remote control 210 may include a microphone 212 for receiving voice commands from users 232. Data representing such voice commands may be transmitted to the media device 206 using any wireless means, such as RF, WiFi, cellular, infrared, etc. Also or alternatively, the media device 206 may include a microphone (not shown) for receiving voice commands from users 232.

The remote control 210 may also include a speaker 213 and a sensor 215, e.g., an accelerometer or a gyroscope, which are further described below.

The multimedia environment 202 may include a plurality of content servers 220 (also called content providers or sources 220). Although only one content server 220 is shown in FIG. 2, in practice the multimedia environment 202 may include any number of content servers 220. Each content server 220 may be configured to communicate with network 218.

Each content server 220 may store content 222 and metadata 224. Content 222 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 224 comprises data about content 222. For example, metadata 224 may include associated or ancillary information indicating or related to writer, director, producer, composer, artist, actor, summary, chapters, production, history, year, trailers, alternate versions, related content, applications, and/or any other information pertaining or relating to the content 222. Metadata 224 may also or alternatively include links to any such information pertaining or relating to the content 222. Metadata 224 may also or alternatively include one or more indexes of content 222, such as but not limited to a trick mode index.

The multimedia environment 202 may include one or more system servers 226. The system servers 226 may operate to support the media devices 206 from the cloud. It is noted that the structural and functional aspects of the system servers 226 may wholly or partially exist in the same or different ones of the system servers 226.

The media devices 206 may exist in thousands or millions of media systems 204. Accordingly, the media devices 206 may lend themselves to crowdsourcing embodiments and, thus, the system servers 226 may include one or more crowdsource servers 228.

For example, using information received from the media devices 206 in the thousands and millions of media systems 204, the crowdsource server(s) 228 may identify similarities and overlaps between closed captioning requests issued by different users 232 watching a particular movie. Based on such information, the crowdsource server(s) 228 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 228 may operate to cause closed captioning to be automatically turned on and/or off during future streamings of the movie. This crowdsourcing example is described, for example, in U.S. Pat. No. 9,749,700 filed Nov. 21, 2016 and titled "Automatic Display of Closed Captioning Information."

The system servers 226 may also include an audio command processing module 230. As noted above, the remote control 210 may include the microphone 212 and the speaker 213. The microphone 212 may receive audio data from users 232 (as well as other sources, such as the display device 208). The speaker 213 may provide audible notifications (such as beeps) to the user 232. As noted above, in some embodiments, the media device 206 may be voice responsive, and the audio data may represent voice commands from the user 232 to control the media device 206 as well as other components in the media system 204, such as the display device 208.

In some embodiments, the audio data received by the microphone 212 in the remote control 210 is transferred to the media device 206, which is then forwarded to the audio command processing module 230 in the system servers 226. The audio command processing module 230 may operate to process and analyze the received audio data to recognize the user 232's voice command. The audio command processing module 230 may then forward the voice command back to the media device 206 for processing.

Figure 3:
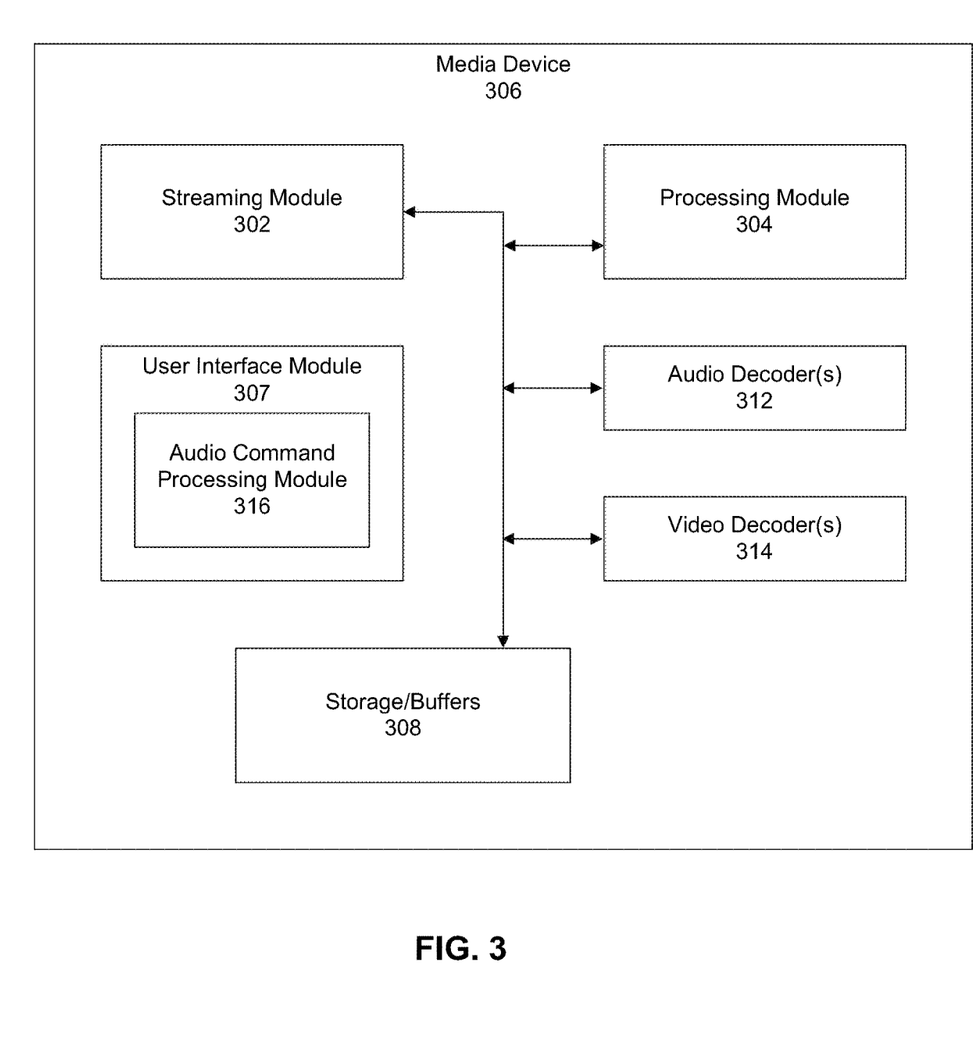
FIG. 3 illustrates a block diagram of an example media device, according to some embodiments.

In some embodiments, the audio data may be alternatively or additionally processed and analyzed by an audio command processing module 316 in the media device 206 (see FIG. 3). The media device 206 and the system servers 226 may then cooperate to pick one of the voice commands to process (either the voice command recognized by the audio command processing module 230 in the system servers 226, or the voice command recognized by the audio command processing module 216 in the media device 206)). An example of such operation is described in U.S. application Ser. No. 16/032,868 filed Jul. 11, 2018 and titled "Local and Cloud Speech Recognition".

In some embodiments, one or more of the functionalities as described above with respect to VCR 102 may be performed by the audio command processing module 230 in system servers 226 as illustrated in FIG. 2. For example, audio command processing module 230 may perform an automatic gain adjustment of the voice command 104 to better ensure that the action command 116 in the voice command 104 is accurately recognized. To achieve this, VCR 102 may analyze an amplitude of the wake word or wake command 114 in the voice command 104, and determine the nature of an automatic gain adjustment 120 to be applied to the wake command 114 so as to satisfy a minimum amplitude requirement associated with the speech to text conversion process as may be indicated by target amp 124.

For example, the audio command processing module 230 may measure a difference between the amplitude of the wake command 114 and a target amplitude 124 to determine the automatic gain adjustment 120 needed. In an embodiment, target amplitude 124 may include a range of acceptable values.

In some embodiments, the audio command processing module 230 may predict that the audio characteristics, such as loudness or gain, of the action command 116 portion of the voice command 104 may be at a same amplitude as the wake command 114, and as such, apply the automatic gain adjustment 120 calculated based on the wake command 114 to the action command 116 to reach the target amplitude 124. In this way, the audio command processing module 230 may proactively apply the automatic gain adjustment 120 to the action command 116, rather than waiting to analyze the action command 116 itself, which could result in extra delays. As a result, the audio command processing module 230 provides for reduced processing time for converting the voice command 104 from speech to text.

In some embodiments, the audio command processing module 230 may also use historical information or data 130 of previous voice commands to determine the automatic gain adjustment 120. For example, the audio command processing module 230 may analyze automatic gain adjustments applied to previous voice commands and predict what automatic gain adjustment should be for a current or subsequent voice command 104 based on the automatic gain adjustment applied to previous voice commands 104. In an embodiment, this predicted gain may be applied to subsequent wake commands 114 and/or action commands 116.

Furthermore, in some embodiments, the audio command processing module 230 may analyze historical data 130 to remove any anomalies. For example, the audio command processing module 230 may compare the amplitude of the wake commands 114 in the historical data 130 and identify instances where the wake amplitude 122 of a current wake command 114 is higher or lower in comparison to other wake amps 122 in historical data 130.

For example, in some embodiments, the audio command processing module 230 may remove or separately store the anomalies using a median filter to smooth out the historical information or historical data 130. As an example, the audio command processing module 230 may determine that an amplitude of the wake words may generally fall within a range, e.g., −18 dB to −22 dB, and the audio command processing module 230 may determine that any wake words with wake amplitudes 122 falling outside that range are anomalies and should be discarded from the historical data 130. By removing any outliers from historical data 130, the audio command processing module 230 may prevent applying too much or too little gain to the present or a subsequent action command 116 in a voice command 104 when using historical data 130.

The audio command processing module 230 may also apply the automatic gain adjustment 120 in response to detecting that the voice command is a continuous stream of speech, as discussed above. In this way, the audio command processing module 230 may ensure that the automatic gain adjustment is being applied to actual voice commands spoken by users 232, rather than other ambient noise.

In an embodiment, the audio command processing module 230 may include a feedback loop to improve the automatic gain adjustment 120. For example, the audio command processing module 230 may analyze the amplitudes of both the wake word and the command in voice commands, and determine that the amplitude of the command is historically lower (or higher) than the amplitude of the wake word. Using this information, the audio command processing module 230 may determine a difference in the amplitudes of both the wake word or wake command 114 and the action command 116, scale the automatic gain adjustment 120 or compute a correction 132 for the action command 116 so as to compensate for the difference in the amplitudes of the wake word and the action command 116.

The feedback loop may also include an analysis of the amplitude of the voice command after the automatic gain adjustment to determine an accuracy of the automatic gain adjustment. For example, the analysis may include comparing a post-adjustment amplitude of the voice command to the target amplitude. Using this information, the audio command processing module 230 may determine a correction factor 132 for adjusting the automatic gain adjustment applied to the action command. For example, the audio command processing module 230 may determine a difference between the post-adjustment amplitude and the target amplitude and compare this difference to a threshold value. When the difference exceeds the threshold value, the correction factor 132 may indicate that the automatic gain adjustment should be reduced (or increased) accordingly.

As discussed above, the audio command processing module 230 may be configured to differentiate between different users 232 using one or more speaker detection processes. Based on which user 232 is interacting with the remote control 210, the audio command processing module 230 may use the historical information of that particular user to determine the gain to be applied to the command portion of the voice command. In some embodiments, when the audio command processing module 230 does not recognize a particular user 232, the audio command processing module 230 may apply a gain adjustment to the command based on any of the embodiments discussed herein.

In some embodiments, the audio command processing module 230 may analyze a given voice command to determine whether it is an actual voice command issued by a user 232. For example, the audio command processing module 230 may determine whether the voice command is an actual voice command based on whether content of the voice command matches an intent from among a plurality of intents that may be executed by the media device 206. In the event that the content of the voice command does not match an intent from among the plurality of intents, the audio command processing module 230 may remove the voice command from the historical information. In this way, voice commands that may have been received from, for example, the display device 208, an inadvertent activation of the remote control 210, or the like do not impact the automatic gain processes described herein.

FIG. 3 illustrates a block diagram of an example media device 306, according to some embodiments. Media device 306 may include a streaming module 302, processing module 304, storage/buffers 308, and user interface module 307. As described above, the user interface module 307 may include the audio command processing module 316.

The media device 306 may also include one or more audio decoders 312 and one or more video decoders 314.

Each audio decoder 312 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 314 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 314 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 232 may interact with the media device 206 via, for example, the remote control 210. For example, the user 232 may use the remote control 210 to interact with the user interface module 307 of the media device 206 to select content, such as a movie, TV show, music, book, application, game, etc. The streaming module 302 of the media device 206 may request the selected content from the content server(s) 220 over the network 218. The content server(s) 220 may transmit the requested content to the streaming module 302. The media device 206 may transmit the received content to the display device 208 for playback to the user 232.

In streaming embodiments, the streaming module 302 may transmit the content to the display device 208 in real time or near real time as it receives such content from the content server(s) 220. In non-streaming embodiments, the media device 206 may store the content received from content server(s) 220 in storage/buffers 308 for later playback on display device 208.

Figure 4:
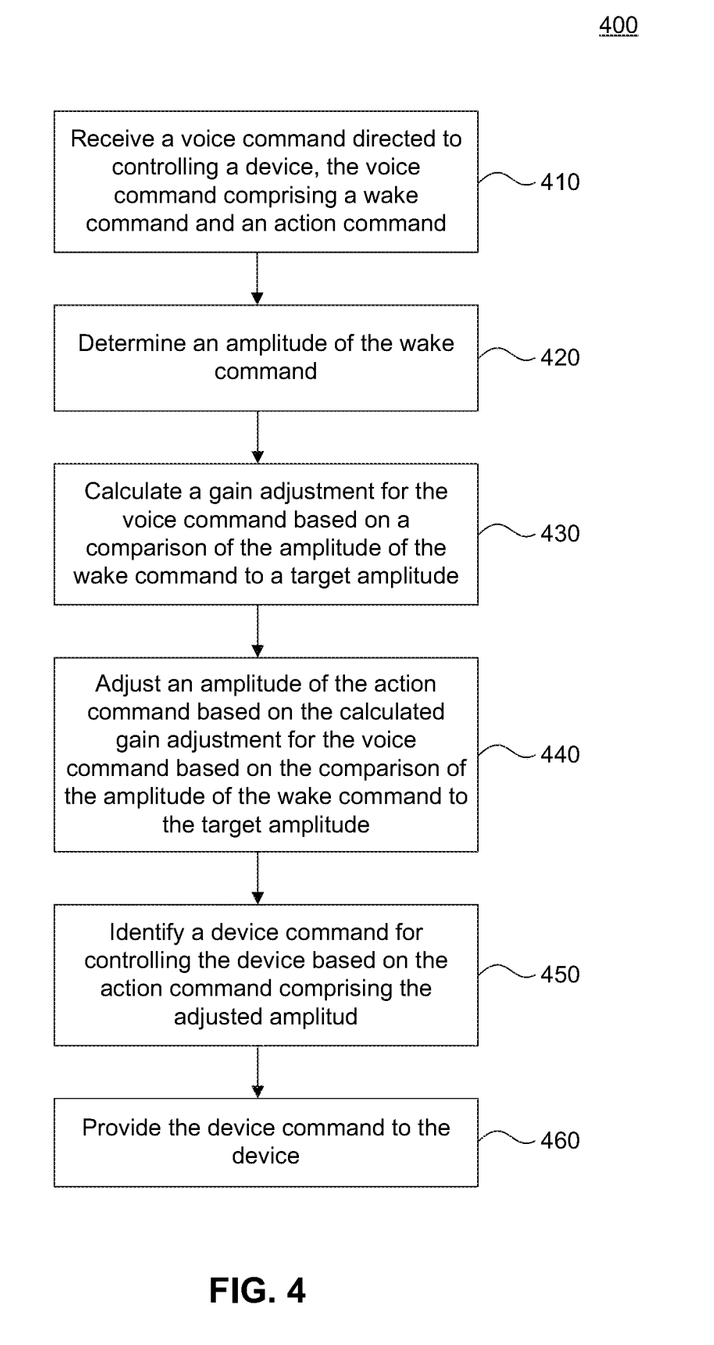
FIG. 4 is a flowchart illustrating example operations for providing a voice command recognition system (VCR), according to some embodiments.

FIG. 4 is a flowchart 400 illustrating example operations for providing a voice command recognition system (VCR), according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Without limiting method 400, method 400 is described with reference to elements of FIG. 1.

At 410, a voice command directed to controlling a device is received, the voice command comprising a wake command and an action command. For example, VCR 102 may receive voice command 104, including both wake command 114 and action command 116, via mic 112.

At 420, an amplitude of the wake command is determined. For example, gain processor 118 may measure, calculate, or otherwise identify a wake amplitude 122 corresponding to the wake command 114. In an embodiment, the wake amp 122 may be identified prior to receiving the action command 116.

At 430, a gain adjustment for the voice command may be calculated based on a comparison of the amplitude of the wake command to a target amplitude. For example, gain processor 118 may calculate gain adjustment 120 based on comparing wake amp 122 to target amp 124. In an embodiment, the gain adjustment 120 may be mathematical function (addition, subtraction, multiplication) of a number to bring wake amp 122 closer to or within a range of values corresponding to target amp 124.

At 440, an amplitude of the action command is adjusted based on the calculated gain adjustment for the voice command based on the comparison of the amplitude of the wake command to the target amplitude. For example, gain processor 118 may apply gain adjustment 120 to action amp 126 or action command 116 and generate gained action command 128. In another embodiment, gain processor 118 may also apply a correction 132, if available.

At 450, a device command for controlling the device based on the action command comprising the adjusted amplitude is identified. For example, VCR 102 may identify a device command 108 corresponding to the gained action command 128. In an embodiment, gained action command 128 may be converted to text, and the text may be used to identify the device command 108.

At 460, the device command is provided to the device. For example, the device command 108 may be "turn on lights" which may be provided to VRD 106. VRD 106 may be communicatively coupled to living room lights. VRD 106 may then execute the device command 108 communicate to turn on living room lights.

Figure 5:
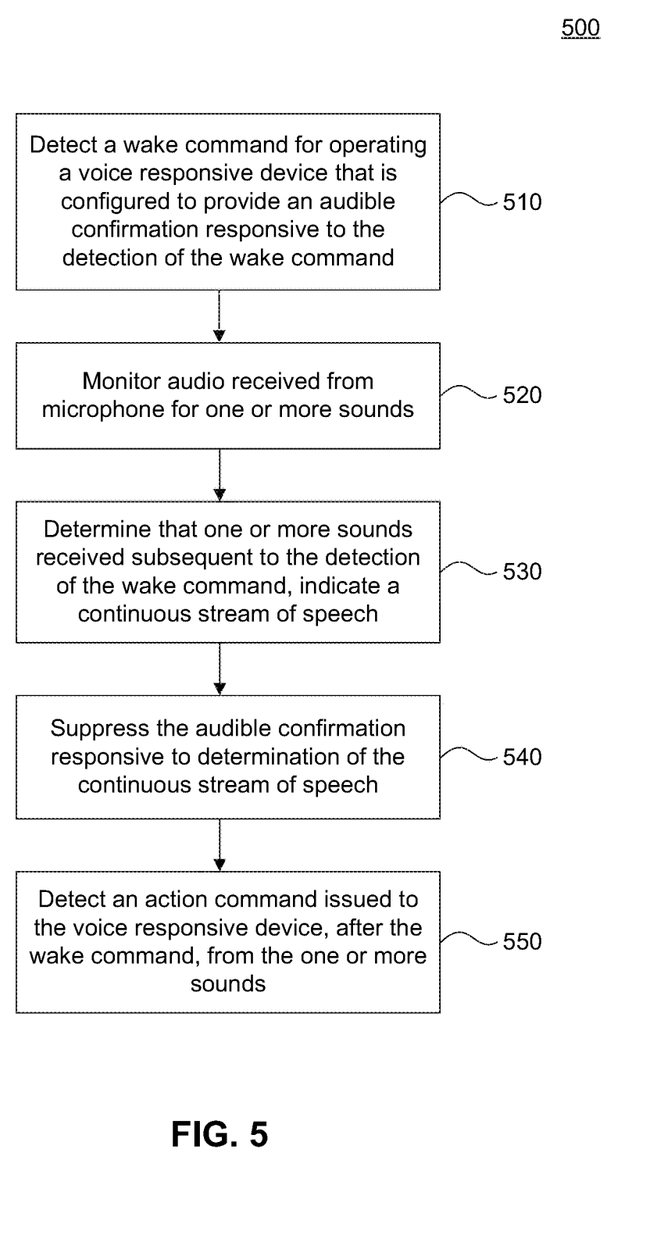
FIG. 5 is a flowchart illustrating example operations for providing a voice command recognition system (VCR) with beep suppression, according to some embodiments.

FIG. 5 is a flowchart 500 illustrating example operations for providing a voice command recognition system (VCR) with beep suppression, according to some embodiments Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Without limiting method 500, method 500 is described with reference to elements of FIG. 1.

At 510, a wake command for operating a voice responsive device is detected, the voice responsive device being configured to provide an audible confirmation responsive to the detection of the wake command. For example, VCR 102 may receive audio through a mic 112. From the audio, VCR 102 may detect a wake command 114 associated with operating VRD 106. The wake command 114 may be one or more words that signal that an operational or action command 116 is to follow for VRD 106.

At 520, audio received from microphone for one or more sounds. For example, upon detecting wake command 114, VCR 102 may continue monitoring mic 112 for any immediately subsequent sounds or energy bursts or amplitudes.

At 530, one or more sounds received subsequent to the detection of the wake command are determined to indicate a continuous stream of speech. For example, audio receiver 134 may determine that there is no pause, or gap, in speech from user 110 after speaking wake command 114. In an embodiment, audio receiver 134 may monitor mic 112 for a threshold period of time (e.g., 1 second of ½ second) to determine if additional speech is received from user 110 during the threshold. If additional speech is detected, e.g., based on the amplitude of the received sounds, then audio receiver 134 may determine that a continuous stream of speech is being provided.

At 540, the audible confirmation is suppressed responsive to determination of the continuous stream of speech. For example, audio receiver 134 may turn down or turn off the volume on beep 136 which VCR 102 or VRD 106 may be configured to audibly output. In another embodiment, audio receiver 134 may not transmit the beep 136 signal for output upon detecting continuous speech.

At 550, an action command issued to the voice responsive device after the wake command is detected from the one or more sounds. For example, VCR 102 may continue to receive and process speech from user 110, detecting action commands 116 for operating VRD 106, without the interferences of beep 136. In an embodiment, the audible beep 136 may be replaced with a visual beep 136, such as a light, or a text message, or pop up on a screen indicating the wake command 114 has been detected. In another embodiment, the beep 136 may be audibly output upon a detection or completion of receiving action command 116, in parallel with or prior to executing the action command 116.

Figure 6:
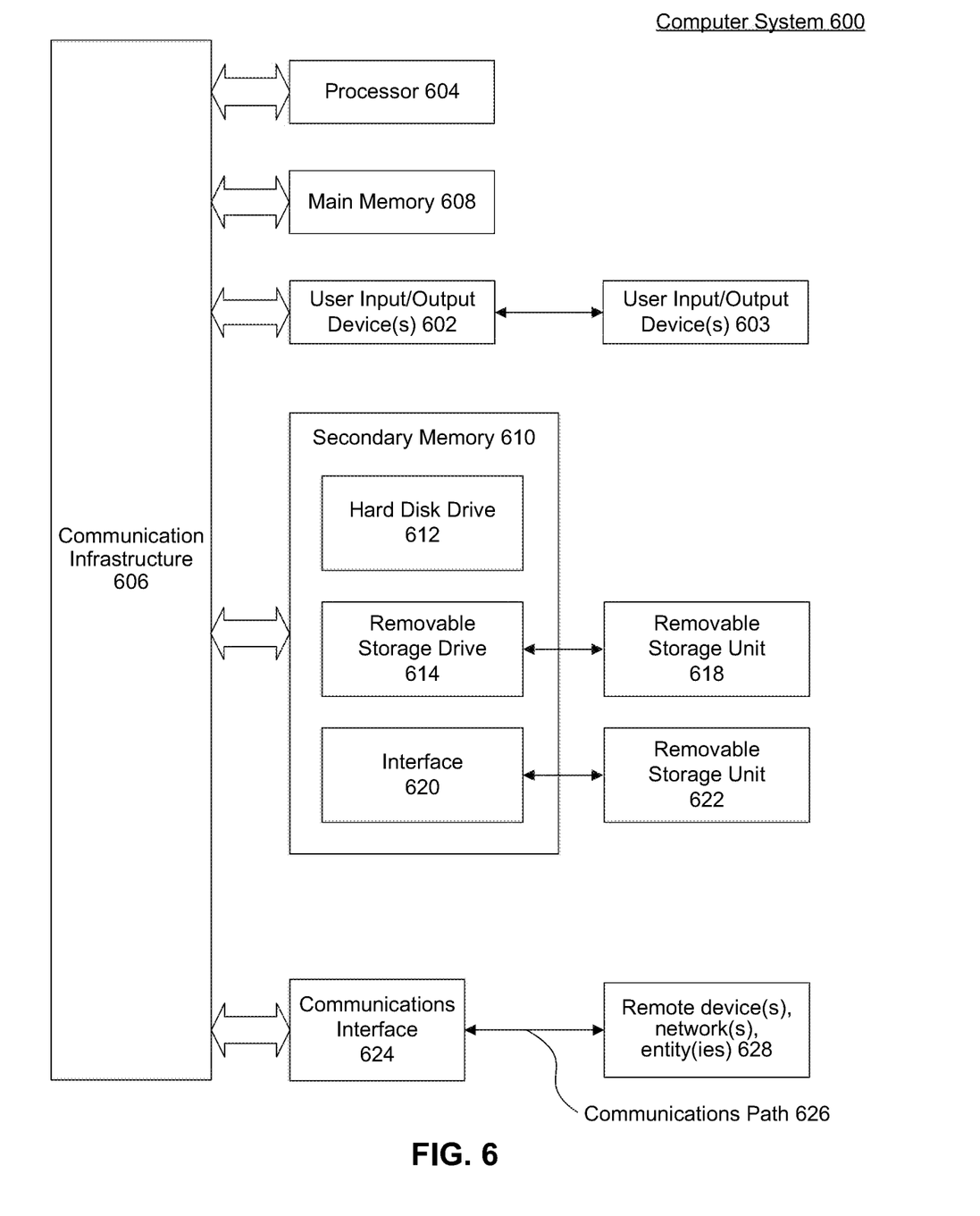
FIG. 6 illustrates an example computer system useful for implementing various embodiments.

Various embodiments may be implemented, for example, using one or more well-known computer systems, such as computer system 600 shown in FIG. 6. For example, the media device 106 may be implemented using combinations or sub-combinations of computer system 600. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

What is claimed is:

1. A computer implemented method, comprising:
receiving a voice command directed to controlling a device, the voice command comprising a wake command and an action command;
determining an amplitude of the wake command;
determining a previous gain adjustment based on historical information identifying calculated gain adjustments for a plurality of previous voice commands;
applying the previous gain adjustment to only the wake command;
adjusting an amplitude of the action command to generate an amplitude-adjusted action command based on the previous gain adjustment applied to the wake command and a difference in the amplitude of the wake command and the amplitude of the action command;
adjusting an amplitude of the amplitude-adjusted action command to generate a second amplitude-adjusted action command based on a difference in the amplitude of the amplitude-adjusted action command and a target amplitude;

identifying a device command for controlling the device based on the second amplitude-adjusted action command; and providing the device command to the device.

2. The method of claim 1, wherein the previous gain adjustment is a median of the calculated gain adjustments for the plurality of previous voice commands.

3. The method of claim 1, further comprising:
determining that the calculated gain adjustment for the wake command is an anomaly, wherein the calculated gain adjustment is excluded from the historical information when processing a subsequent voice command.

4. The method of claim 1, further comprising:
calculating a correction based on the difference in the amplitude of the amplitude-adjusted action command and the target amplitude, wherein the correction is applied to an amplitude of a subsequent action command of a subsequent voice command.

5. The method of claim 4, wherein calculating the correction comprises:
calculating a first correction for a first user; and
calculating a second correction for a second user different from the first user.

6. The method of claim 1, further comprising:
detecting the wake command prior to receiving the action command, wherein the device is configured to output an audible beep upon detecting the wake command;
determining that the voice command comprises a continuous stream of speech after detecting the wake command;
suppressing the audible beep based on the continuous stream of speech determination; and
detecting the wake command from the voice command.

7. The computer implemented method of claim 1, further comprising:
retrieving the historical information via a network.

8. A system, comprising:
a memory; and
at least one processor coupled to the memory and configured to perform operations comprising:
receiving a voice command directed to controlling a device, the voice command comprising a wake command and an action command;
determining an amplitude of the wake command;
determining a previous gain adjustment based on historical information identifying calculated gain adjustments for a plurality of previous voice commands;
applying the previous gain adjustment to only the wake command;
adjusting an amplitude of the action command to generate an amplitude-adjusted action command based on the previous gain adjustment applied to the wake command and a difference in the amplitude of the wake command and the amplitude of the action command;
adjusting an amplitude of the amplitude-adjusted action command to generate a second amplitude-adjusted action command based on a difference in the amplitude of the amplitude-adjusted action command and a target amplitude;
identifying a device command for controlling the device based on the second amplitude-adjusted action command; and
providing the device command to the device.

9. The system of claim 8, wherein the previous gain adjustment is a median of the calculated gain adjustments for the plurality of previous voice commands.

10. The system of claim 8, wherein the operations further comprise:
determining that the calculated gain adjustment for the voice command is an anomaly, wherein the calculated gain adjustment for the wake command is excluded from the historical information when processing a subsequent voice command.

11. The system of claim 8, wherein the operations further comprise:
calculating a correction based on the difference in the amplitude of the amplitude-adjusted action command and the target amplitude, wherein the correction is applied to an amplitude of a subsequent action command of a subsequent voice command.

12. The system of claim 11, wherein calculating the correction comprises:
calculating a first correction for a first user; and
calculating a second correction for a second user different from the first user.

13. The system of claim 8, wherein the operations further comprise:
detecting the wake command prior to receiving the action command, wherein the device is configured to output an audible beep upon detecting the wake command;
determining that the voice command comprises a continuous stream of speech after detecting the wake command;
suppressing the audible beep based on the continuous stream of speech determination; and
detecting the wake command from the voice command.

14. The system of claim 9, wherein the operations further comprise:
retrieving the historical information via a network.

15. A non-transitory computer-readable medium having instructions stored thereon that, when executed by at least one computing device, cause the at least one computing device to perform operations comprising:
receiving a voice command directed to controlling a device, the voice command comprising a wake command and an action command;
determining an amplitude of the wake command;
determining a previous gain adjustment based on historical information identifying calculated gain adjustments for a plurality of previous voice commands;
applying the previous gain adjustment to only the wake command;
adjusting an amplitude of the action command to generate an amplitude-adjusted action command based on the previous gain adjustment applied to the wake command and a difference in the amplitude of the wake command and the amplitude of the action command;
adjusting an amplitude of the amplitude-adjusted action command to generate a second amplitude-adjusted action command based on a difference in the amplitude of the amplitude-adjusted action command and a target amplitude;
identifying a device command for controlling the device based on the second amplitude-adjusted action command; and
providing the device command to the device.

16. The non-transitory computer-readable medium of claim 15, wherein the previous gain adjustment is a median of the calculated gain adjustments for the plurality of previous voice commands.

17. The non-transitory computer-readable medium of claim 15, wherein the operations further comprise:
    determining that the calculated gain adjustment for the wake command is an anomaly, wherein the calculated gain adjustment is excluded from the historical information when processing a subsequent voice command.

18. The non-transitory computer-readable medium of claim 15, wherein the operations further comprise:
    calculating a correction based on the difference in the amplitude of the amplitude-adjusted action command and the target amplitude, wherein the correction is applied to an amplitude of a subsequent action command of a subsequent voice command.

19. The non-transitory computer-readable medium of claim 18, wherein calculating the correction comprises:
    calculating a first correction for a first user; and
    calculating a second correction for a second user different from the first user.

20. The non-transitory computer-readable medium of claim 15, wherein the operations further comprise:
    detecting the wake command prior to receiving the action command, wherein the device is configured to output an audible beep upon detecting the wake command;
    determining that the voice command comprises a continuous stream of speech after detecting the wake command;
    suppressing the audible beep based on the continuous stream of speech determination; and
    detecting the wake command from the voice command.

* * * * *

UNITED STATES PATENT AND TRADEMARK OFFICE
CERTIFICATE OF CORRECTION

PATENT NO. : 12,334,065 B2
APPLICATION NO. : 17/315704
DATED : June 17, 2025
INVENTOR(S) : Birt et al.

Page 1 of 1

It is certified that error appears in the above-identified patent and that said Letters Patent is hereby corrected as shown below:

In the Claims

In Column 18, Claim 14, Line 34, delete "claim 9," and insert -- claim 8, --, therefor.

Signed and Sealed this
Second Day of December, 2025

John A. Squires
*Director of the United States Patent and Trademark Office*